No. 879,452. PATENTED FEB. 18, 1908.
H. FOERSTERLING & H. R. CARVETH.
PROCESS OF MAKING MOLTEN PEROXIDS.
APPLICATION FILED MAR. 6, 1907.
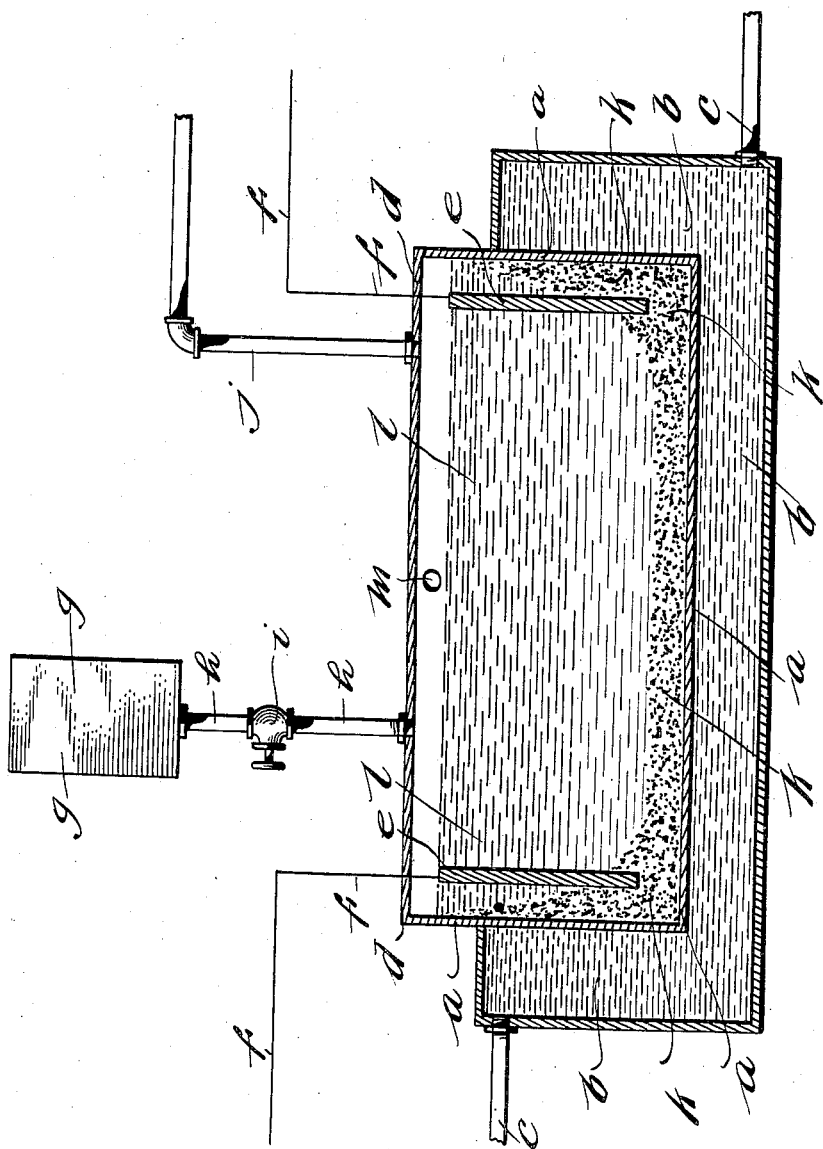
Witnesses:
Robert W. Ashby
Andrew M. Smith
Inventors
Hans Foersterling and
Hector R. Carveth
By their Attorneys.
Mastick & Jones

UNITED STATES PATENT OFFICE.

HANS FOERSTERLING, OF PERTH AMBOY, NEW JERSEY, AND HECTOR R. CARVETH, OF NIAGARA FALLS, NEW YORK, ASSIGNORS TO THE ROESSLER & HASSLACHER CHEMICAL CO., OF NEW YORK, N. Y., A CORPORATION OF NEW YORK.

PROCESS OF MAKING MOLTEN PEROXIDS.

No. 879,452.   Specification of Letters Patent.   Patented Feb. 18, 1908.

Application filed March 6, 1907. Serial No. 360,993.

*To all whom it may concern:*

Be it known that we, HANS FOERSTERLING, a subject of the German Emperor, residing at Perth Amboy, in the county of Middlesex, New Jersey, and HECTOR R. CARVETH, a citizen of the United States, residing at Niagara Falls, in the county of Niagara and State of New York, have invented a certain new and useful Process of Making Molten Peroxids, of which the following is a specification.

The invention relates to a process of making fused or molten peroxids and has particular reference to fusing or melting sodium peroxid in connection with which the following is a description of one way of carrying out the process.

By our new process we are enabled to make fused or molten peroxid directly by bringing air or other oxidizing agent in reaction with the substance at such a temperature that the resulting peroxid is instantaneously molten.

The drawings show diagrammatically a suitable apparatus for use in practicing our new process, which process we shall describe in the making of fused sodium peroxid although it may be practiced in the making of other peroxids than sodium.

Heretofore fused or molten sodium peroxid, which substance is of special utility in generating oxygen, has been made by melting the sodium peroxid by either indirect heat or electrically. These processes are expensive inasmuch as the sodium peroxid must first be prepared by some such process as that described in U. S. Letters Patent to Castner, No. 494,757, or U. S. Letters Patent to Baker and Burwell, No. 739,375, and subsequently heated to a high temperature in order to melt it.

In the drawings $a$ represents a suitable vessel provided with a water jacket $b$ in order to cool the vessel sufficiently to protect it from the oxidizing effect of the molten peroxid.

$c, c$, are inlet and outlet pipes for the water jacket $b$.

$d$ is a cover, preferably making air tight closure of vessel $a$.

$e, e$, are electrodes connected by wires $f, f$, with a suitable source of electrical energy (not shown).

$g$ is a tank adapted to contain molten sodium and provided with an outlet pipe $h$, controlled by cock $i$, discharging into vessel $a$ through cover $d$.

$j$ is a pipe adapted to deliver air, preferably under pressure, into vessel $a$ through cover $d$.

$k$ represents solidified peroxid and $l$ molten peroxid in a liquid state.

$m$ is an outlet for the molten peroxid to be withdrawn from vessel $a$.

Vessel $a$ should first be filled with fused sodium peroxid, kept in a state of fusion by means of a current of electricity passing between the electrodes $e, e$, a lining of solidified peroxid gradually being formed on the inside of vessel $a$ as shown at $k$. Molten sodium is then permitted to flow through pipe $h$ into vessel $a$ simultaneously with the admission of air into said vessel through pipe $j$. The molten sodium floating on top of the molten peroxid is rapidly oxidized by the air and taken up by the molten peroxid, the excess of molten peroxid flowing continuously out of vessel $a$ through outlet $m$. The heat generated by oxidizing the sodium is utilized most economically as experiment shows that after the reaction has once started little if any heat is required to be supplied from the electric generator, the heat generated by the oxidation being practically sufficient to melt the peroxid formed.

It is to be understood that the process may be varied in many ways. Instead of initially charging the vessel with molten peroxid, caustic soda or any other fusible product which does not react with the peroxid may be used. Instead of using electricity other methods of heating may be employed, other metals than sodium, such as any alkaline metal or alloy, or a mixture of them, may be used, and any suitable substance may be added during the process without departing from the spirit of our invention.

What we claim and desire to secure by Letters Patent is:—

1. A process of making molten alkaline oxids which consists in bringing the metal to be oxidized into reaction with an oxidizing agent at such a temperature that the resulting oxid is instantaneously molten.

2. A process of making molten alkaline oxid which consists in bringing the metal to be oxidized into reaction with an oxidizing agent and utilizing the heat generated by the reaction to melt the resulting oxids.

3. A process of making molten alkaline peroxid which consists in bringing the metal to be oxidized into reaction with an oxidizing agent at such a temperature that the resulting peroxid is instantaneously molten.

4. A process of making molten alkaline peroxid which consists in bringing the metal to be oxidized into reaction with an oxidizing agent and utilizing the heat generated by the reaction to melt the resulting peroxid.

5. A process of making molten sodium peroxid which consists in bringing molten sodium into reaction with air and utilizing the heat generated by the reaction to melt the resulting peroxid.

In testimony whereof we have hereunto signed our names in the presence of two subscribing witnesses.

HANS FOERSTERLING.
    HECTOR R. CARVETH.

Witnesses:
 JESSIE B. McVEAN,
 LOUIS J. HOENIG.